United States Patent
Bhatnagar et al.

(10) Patent No.: US 12,486,363 B2
(45) Date of Patent: Dec. 2, 2025

(54) PROCESS FOR PREPARING A POLYSULFONE (PSU) POLYMER

(71) Applicant: SYENSQO SPECIALTY POLYMERS USA, LLC, Alpharetta, GA (US)

(72) Inventors: Atul Bhatnagar, Alpharetta, GA (US);
Gregory Goschy, Cumming, GA (US);
Chantal Louis, Alpharetta, GA (US);
David B. Thomas, Milton, GA (US)

(73) Assignee: SYENSQO SPECIALTY POLYMERS USA, LLC, Alpharetta, GA (US)

( * ) Notice: Subject to any disclaimer, the term of this patent is extended or adjusted under 35 U.S.C. 154(b) by 822 days.

(21) Appl. No.: 17/775,897

(22) PCT Filed: Nov. 17, 2020

(86) PCT No.: PCT/EP2020/082350
§ 371 (c)(1),
(2) Date: May 11, 2022

(87) PCT Pub. No.: WO2021/099297
PCT Pub. Date: May 27, 2021

(65) Prior Publication Data
US 2022/0396668 A1 Dec. 15, 2022

Related U.S. Application Data

(60) Provisional application No. 62/937,679, filed on Nov. 19, 2019.

(30) Foreign Application Priority Data

Jan. 22, 2020 (EP) ..................................... 20153087

(51) Int. Cl.
| | |
|---|---|
| C08G 75/23 | (2006.01) |
| C08G 75/0204 | (2016.01) |
| C08G 75/025 | (2016.01) |
| C08L 81/06 | (2006.01) |

(52) U.S. Cl.
CPC .......... *C08G 75/23* (2013.01); *C08G 75/0204* (2013.01); *C08G 75/025* (2013.01); *C08L 81/06* (2013.01)

(58) Field of Classification Search
CPC .... C08G 75/20; C08G 75/23; C08G 75/0204; C08G 65/2612; C08L 81/06; C08K 2003/262; C08K 3/26
See application file for complete search history.

(56) References Cited

U.S. PATENT DOCUMENTS

| | | |
|---|---|---|
| 5,194,561 A | 3/1993 | Fischer et al. |
| 2009/0275725 A1 | 11/2009 | Dienes et al. |
| 2012/0029106 A1 | 2/2012 | Weber et al. |
| 2017/0321031 A1 | 11/2017 | Weber et al. |

FOREIGN PATENT DOCUMENTS

| | | |
|---|---|---|
| EP | 412499 A2 | 2/1991 |
| JP | 01245018 A | 9/1989 |
| JP | 03294332 A | 12/1991 |
| JP | 0586186 A | 4/1993 |
| WO | 0166620 A2 | 9/2001 |
| WO | 2019145235 A1 | 8/2019 |
| WO | 2019219866 A1 | 11/2019 |

OTHER PUBLICATIONS

ASTM D4001-93—Standard Test Method for Determination of Weight-Average Molecular Weight fo Polymers by Light Scattering, 1993, p. 1-11.
ASTM E313-05—Standard Practice for Calculating Yellowness and Whiteness Indices from Instrumentally Measured Color Coordinates, 2005, p. 1-6.

*Primary Examiner* — Marc S Zimmer
*Assistant Examiner* — Surbhi M Du

(57) ABSTRACT

The present invention relates to a process for preparing a polysulfone (PSU) polymer having a low yellowness index (YI). The present disclosure also relates to a PSU obtained from this process, as well as to articles incorporating this PSU.

14 Claims, No Drawings

PROCESS FOR PREPARING A POLYSULFONE (PSU) POLYMER

CROSS REFERENCE TO RELATED APPLICATIONS

This application is a U.S. national stage entry under 35 U.S.C. § 371 of International Application No. PCT/EP2020/082350 filed Nov. 17, 2020, which claims priority to U.S. provisional patent application No. 62/937,679, filed on Nov. 19, 2019, and to EP patent application No. 20153087.0 filed on Jan. 22, 2020, the whole content of these applications being incorporated herein by reference for all purposes.

TECHNICAL FIELD

The present disclosure relates to a process for preparing a polysulfone (PSU) polymer having a low yellowness index (YI). The present disclosure also relates to a PSU obtained from this process, as well as to articles incorporating this PSU.

BACKGROUND ART

Polysulfone (PSU) polymers belong to the group of high-performance thermoplastics and are characterized by good mechanical properties. PSU is notably commercially available from Solvay Specialty Polymers LLC under the tradename UDEL®.

PSU, and more broadly poly(arylethersulfone) (PAES), can be prepared by polycondensation reactions via the hydroxide method or via the carbonate method. In the hydroxide method, a salt is formed from a dihydroxy component and the hydroxide; then the formed anhydrous diphenolate dianion is subsequently reacted with an aromatic dihalogen compound. The hydroxide method is usually less preferred for the reasons that first, the stoichiometry has to be carefully monitored, second, the process is a two-stage synthesis and third, the use of strong bases is less tolerant to stoichiometry deviations and can negatively impact the polymer molecular weight build. As far as the carbonate method is concerned, the aromatic dihydroxyl compound and the aromatic dihalogen compound are reacted together in the presence of carbonates, for example sodium carbonate ($Na_2CO_3$), calcium carbonate ($CaCO_3$) or potassium carbonate ($K_2CO_3$), and in a polar aprotic solvent. According to the literature, N,N-dimethylacetamide (DMAc) and N-methyl-2-pyrrolidinone (NMP) are usually preferred as polar aprotic solvents in the carbonate method. Also typically described is the additional use of a solvent which forms an azeotrope with water (e.g. toluene), whereby water formed as a byproduct during the polymerization may be removed by azeotropic distillation continuously throughout the polymerization.

Several patent documents describe the preparation of PAES polymers according to a condensation process carried out in different solvents and equipment.

EP 0 412 499 A1 (DEGUSSA) describes a method of forming PAES polymers, wherein the dihalogen component is 4,4'-dichlorodiphenyl sulfone or 4,4'-difluorodiphenyl sulfone and the dihydroxy components include 4,4'-isopropylidenediphenol, 4,4'-dihydroxydiphenyl sulfone and 4,4'-dihydroxybenzophenone. The condensation is carried out in diphenylsulfone (DPS) in the presence of sodium carbonate.

WO 01/66620 A1 (SOLVAY) describes poly(biphenyl ether sulfones) (PPSU) having improved color. The polymers are prepared by the carbonate process in a solvent mixture comprising a polar aprotic solvent and a solvent which forms an azeotrope with water. The polar aprotic solvent is chosen among dimethylsulfoxide (DMSO), dimethylsulfone, diphenylsulfone (DPS), diethylsulfoxide, diethylsulfone, diisopropylsulfone, sulfolane, tetrahydrothiophene-1-monoxide, N,N-dimethylacetamide (DMAc), N,N-dimethylformamide (DMF) and N-methyl-2-pyrrolidinone (NMP).

JP3294332 (Ube Industries) relates to a process for preparing a thermoplastic sulfone polymer which is low in color, wherein the dihalogen component is 4,4'-dichlorodiphenyl sulfone and the dihydroxy components selected from hydroquinone, catechol, resorcinol, bis(hydroxyphenyl)alkanes, dihydroxydiphenylsulfones, 4,4'-biphenol and dihydroxyldiphenylethers. More precisely, the examples describe the preparation of a sulfone polymer based on 4,4'-dichlorodiphenyl sulfone and 4,4'-bis(4-hydroxyphenyl)propane in 1,3-dimethyl-2-imidazolidinone (DMI), in the presence of toluene, as a solvent which forms an azeotrope with water.

US 2009/0275725 A1 (BASF) describes a process for the preparation of polysulfones having a yellowness index according to DIN 6167, carried out in basic aprotic solvents selected in the group consisting of N-methyl-pyrrolidinone (NMP), N-ethyl-pyrrolidinone (NEP), sulfolane, N,N-dimethylacetamide (DMAc), N,N-dimethylformamide (DMF) or dimethylsulfoxide (DMSO), and the invention is based on the use of specific piece of equipment, i.e. a positively conveying stirrer passing close to the wall.

US 2012/029106 A1 (BASF) describes a process for the production of low-chlorine-content polybiphenyl sulfone polymers (PPSU) based on the reaction of 4,4'-dihydroxybiphenyl and 4,4'-dichlorodiphenyl sulfone, the reaction being carried out with a molar excess of dihydroxy monomer, in NMP.

JP H05 86186 (Mitsui) relates to a polyether sulfone produced by the polycondensation of a biphenol and 4,4'-dichlorodiphenyl sulfone by using DMI as the polymerization solvent. This document describes in its example 2 the preparation of a PSU polymer using a strong base chemistry (KOH) in DMI and toluene, according to which when all components are added to the reaction mixture, the mixture is heated to one processing temperature of 150° C. for 4 hours. The amount of PSU at the end of the condensation represents 26.9 wt. % based on the total weight of the PSU and the solvent.

The inventors have realized that all the preparation processes described in the literature give sulfone polymers which can be improved with regard to their molecular weight, and optical properties, more precisely their yellowness index.

An object of the present invention is to provide a process for the preparation of polysulfone polymers having a low yellowness index (YI), without compromising their mechanical properties. The process of the present invention is notably based on the use of 1,3-dimethyl-2-imidazolidinone (DMI) as a solvent.

SUMMARY OF INVENTION

An aspect of the present disclosure is directed to a process for preparing a polysulfone (PSU) polymer. The applicant has found that the process of the present invention which takes place in a solvent which comprises 1,3-dimethyl-2-imidazolidinone (DMI), allows obtaining a PSU having a low yellowness index (YI), without compromising its mechanical properties, and even surprisingly improving its flexural strength. The PSU of the present invention also advantageously present a low level of cyclic dimers. This makes the PSU obtained the process of the present invention well suited for the fabrication of membranes.

The process of the present invention comprises the steps of reacting an aromatic dihydroxy monomer (a1) comprising 4,4'-isopropylidenediphenol with an aromatic dihalogen sulfone monomer (a2), in the presence of one carbonate component, in a solvent which is 1,3-dimethyl-2-imidazolidinone (DMI). The process of the present invention notably comprises a step of heating the reaction mixture ($R_G$) to a temperature $T_H$, and optionally maintaining it to this temperature for at least 20 minutes, before increasing the temperature of the reaction mixture ($R_G$) to a reaction temperature $T_R$, wherein the temperatures $T_H$ and $T_R$ are such that $140°$ C.$<T_H<T_R<215°$ C. The inventors have realized that when the polycondensation process in DMI comprises such a step, the PSU polymer advantageously presents a low yellowness index, in addition to having the desired molecular weight (Mw) and polydispersity index (PDI). The PSU polymer obtained from this process also preferably presents a low amount of cyclic dimers and a low amount of residual solvent, which makes such polymer well-suited to prepare hollow fibers and membranes, for example. The PSU polymer obtained from this process has a weight average molecular weight (Mw) ranging from 70,000 g/mol to 200,000 g/mol, as measured by Size Exclusion Chromatography (SEC), as well as a polydispersity index (PDI) of less than 4 (PDI is Mw/Mn).

Advantageously, the process of the present invention does not require the use of a solvent which forms an azeotrope with water.

Another aspect of the present disclosure is a polysulfone (PSU) polymer obtainable by the process of the present invention.

The present disclosure also relates to an article comprising the PSU of the invention or a polymer composition comprising this PSU. The PSU polymers of the present invention are notably well-suited for the fabrication of porous hollow fibers and flat sheet membranes using a solvent-based process. The PSU polymers can advantageously be used in a variety of membrane filtration applications, such as renal dialysis, water treatment, bio-processing, food and beverage processing and industrial gas separation. The low color PSU prepared according to the process of the present invention interestingly presents a superior appearance, which makes it well-adapted for applications where color, particularly a yellow color, is unacceptable, for example, in lenses, filters and other optical goods, for transparent covers or lids and in containers, glazing and articles where transparency with low color is desirable or necessary. Because they advantageously have no color, the PSU polymer of the present invention can be dyed or pigmented to achieve a desired coloration more efficiently. The polymers of the present invention can thus also find use in filled and pigmented applications, particularly where white and brightly-colored goods are desired.

DESCRIPTION OF EMBODIMENTS

An object of the present invention is to provide a process for preparing a polysulfone (PSU) polymer having a low yellowness index (YI). The process of the present invention takes place in a solvent which comprises 1,3-dimethyl-2-imidazolidinone (DMI) and preferably in the absence of a solvent which forms an azeotrope with water. The process of the present invention presents the advantages of being simple to carry out and inexpensive. PSU polymers prepared according to this method have a narrow molecular weight distribution and therefore a low narrow polydispersity index (PDI) and can be used in many applications, notably in the manufacture of membranes.

The present disclosure more precisely relates to a process for preparing a polysulfone (PSU) polymer having a weight average molecular weight (Mw) of from 70,000 g/mol to 200,000 g/mol, and a polydispersity index (PDI) of less than 4. The process comprises the step of condensing in a reaction mixture (RG) comprising:

at least one aromatic dihydroxy monomer (a1) comprising 4,4'-isopropylidenediphenol;

at least one aromatic dihalogen sulfone monomer (a2) comprising at least one dihalogen compound selected from the group consisting of 4,4'-dichlorodiphenyl sulfone (DCPDS) and 4,4'-difluorodiphenyl sulfone (DFDPS), based on the overall weight of component (a2) in reaction mixture (RG);

at least one carbonate component;

a solvent which comprises 1,3-dimethyl-2-imidazolidinone (DMI);

wherein the amount of PSU at the end of the condensation is at least 30 wt. % based on the total weight of the PSU and the solvent comprising DMI. The process comprises a step of heating the reaction mixture ($R_G$) to a temperature $T_H$, and optionally maintaining it to this temperature for at least 20 minutes, before increasing the temperature of the reaction mixture ($R_G$) to a reaction temperature $T_R$, wherein the temperatures $T_H$ and $T_R$ are such that $140°$ C.$<T_H<T_R<215°$ C.

The process of the invention leads to high yield of PSU polymer in a limited period of time and can be implemented in industrial plants. The PSU obtained from the process of the present invention not only presents a low yellowness index (YI), but also surprisingly presents good mechanical properties (notably elastic modulus and flexural strength, as shown in the experimental part). The PSU of the present invention preferably has less than 400 ppm (wt) content of polymer-bonded chlorine, based on the total weight of the PSU.

The expressions "(co)polymer" or "polymer" are hereby used to designate homopolymers containing substantially 100 mol. % of the same recurring units and copolymers comprising at least 50 mol. % of the same recurring units, for example at least about 60 mol. %, at least about 65 mol. %, at least about 70 mol. %, at least about 75 mol. %, at least about 80 mol. %, at least about 85 mol. %, at least about 90 mol. %, at least about 95 mol. % or at least about 98 mol. %.

In the present application:

any description, even though described in relation to a specific embodiment, is applicable to and interchangeable with other embodiments of the present disclosure;

where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and any recitation herein of numerical ranges by endpoints includes all numbers subsumed within the recited ranges as well as the endpoints of the range and equivalents.

The PSU polymer obtained through the method of the present invention is characterized by its weight average molecular weight (Mw) and its polydispersity index ("PDI" or "PDI index" herewith), also called sometimes polymolecularity index. The polydispersity or polymolecularity corresponds to the molecular weight distribution of the various macromolecules within the polymer. The PDI index corresponds to the ratio Mw/Mn, the number average molecular weight Mn and weight average molecular weight Mw being determined by as detailed above.

The PSU of the present invention is advantageously characterized in that:
its weight average molecular weight (Mw) ranges between 70,000 g/mol and 200,000 g/mol, for example between 75,000 g/mol and 190,000 g/mol or between 80,000 g/mol and 180,000 g/mol, and
its PDI is less than 4, for example less than 3.8 or less than 3.6.

The weight average molecular weight (Mw) of the PSU of the present invention is determined by Size Exclusion Chromatography (SEC) using Methylene Chloride as a mobile phase.

In some embodiments, the polysulfone (PSU) of the invention comprises recurring units ($R_{PSU}$) of formula (L):

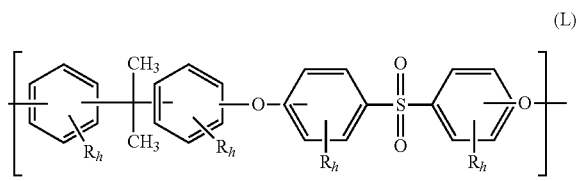

(L)

where
R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;

h, for each R, is independently zero or an integer ranging from 1 to 4.

In some preferred embodiments, R is, at each location in formula (L) above, independently selected from the group consisting of a C1-C12 moiety optionally comprising one or more than one heteroatoms; sulfonic acid and sulfonate groups; phosphonic acid and phosphonate groups; amine and quaternary ammonium groups.

In some preferred embodiments, h is zero for each R, which means that the aromatic cycles are unsubstituted. In other words, according to this embodiment, the recurring units ($R_{PSU}$) are units of formula (L'):

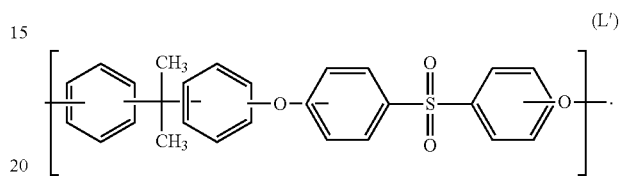

(L')

According to another embodiment, the recurring units ($R_{PSU}$) are units of formula (L"):

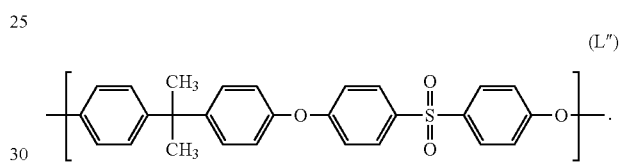

(L")

The PSU polymer of the present invention can therefore be a homopolymer or a copolymer. If it is a copolymer, it can be a random, alternate or block copolymer.

According to an embodiment of the present invention, at least 50 mol. %, at least 60 mol. %, at least 70 mol. %, at least 80 mol. %, at least 90 mol. %, at least 95 mol. %, at least 99 mol. % or all of the recurring units in the PSU are recurring units ($R_{PSU}$) of formula (L), (L') and/or (L").

When the polysulfone (PSU) is a copolymer, it can be made of recurring units ($R^{*}_{PSU}$), different from recurring units ($R_{PSU}$), such as recurring units of formulas (M), (N) and/or (O):

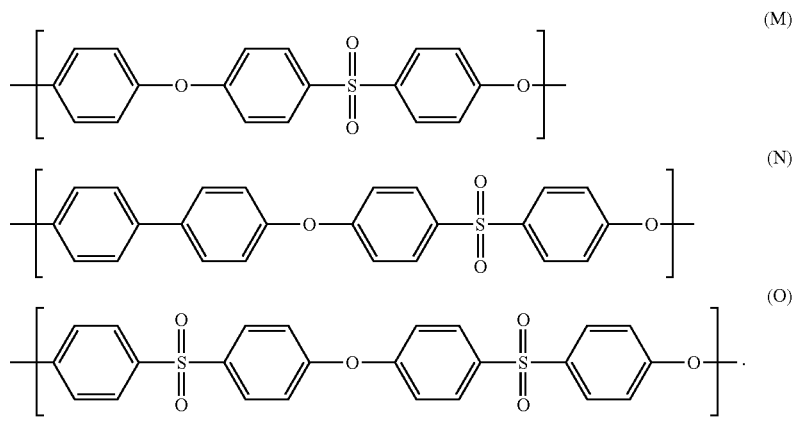

The PSU of the present invention presents a Mw ranging from 70,000 g/mol and 200,000 g/mol. Such a molecular weight can be obtained by adjusting the monomer ratio of monomers (a1):(a2). The condensation can be stopped after the desired Mw has been reached, using an activated aromatic halide or an aliphatic halide, for example methyl chloride, benzyl chloride or the like.

The condensation of the present invention is carried out in a solvent which comprises 1,3-dimethyl-2-imidazolidinone (DMI). The process of the present invention is preferably carried out in a solvent which comprises at least 50 wt. % of DMI, at least 60 wt. % of DMI, at least 70 wt. % of DMI, at least 80 wt. % of DMI, at least 90 wt. % of DMI or at least 95 wt. % of DMI, based on the total weight of the solvent. One or more additional polar aprotic solvents may also be used; they can, for example, be selected from the group consisting of N-methyl-2-pyrrolidinone (NMP), N,N-dimethylformamide (DMF), N,N-dimethylacetamide (DMAC), 1,3-dimethyl-2-imidazolidinone, tetrahydrofuran (THF), dimethyl sulfoxide (DMSO), chlorobenzene and sulfolane. Surprisingly, it has been found that the yellowness index of the PSU polymer obtained according to the present process carried out in 1,3-dimethyl-2-imidazolidinone (DMI) is advantageously low in comparison to a PSU polymer obtained through a condensation process carried out in N-methyl-2-pyrrolidinone (NMP).

The condensation of the present invention is preferably carried out in as a solvent which consists essentially in 1,3-dimethyl-2-imidazolidinone (DMI).

The process of the present invention is carried out in the presence of a carbonate component which is selected in the group of alkali metal hydrogencarbonates, for example sodium hydrogencarbonate ($NaHCO_3$) and potassium hydrogencarbonate ($KHCO_3$), or in the group of alkali metal carbonate, for example potassium carbonate ($K_2CO_3$) and sodium carbonate ($Na_2CO_3$). Preferably the process of the present invention is carried out in the presence of potassium carbonate ($K_2CO_3$), sodium carbonate ($Na_2CO_3$) or a blend of both. According to an embodiment, the process of the present invention is carried out in the presence of a low particle size alkali metal carbonate, for example comprising anhydrous $K_2CO_3$, having a volume-averaged particle size of less than about 100 µm, for example less than 45 µm, less than 30 µm or less than 20 µm. According to a preferred embodiment, the process of the present invention is carried out in in the presence of a carbonate component comprising not less than 50 wt. % of $K_2CO_3$ having a volume-averaged particle size of less than about 100 µm, for example less than 45 µm, less than 30 µm or less than 20 µm, based on the overall weight of the base component in reaction mixture. The volume-averaged particle size of the carbonate used can for example be determined with a Mastersizer 2000 from Malvern on a suspension of the particles in chlorobenzene/sulfolane (60/40).

According to an embodiment of the process of the present invention, the monomer (a1) comprises, based on the total weight of the monomer (a1), at least 50 wt. % of 4,4'-isopropylidenediphenol (bisphenol A), for example at least 60 wt. %, at least 70 wt. %, at least 80 wt. %, at least 90 wt. % or at least 95 wt. % of 4,4'-isopropylidenediphenol. Preferably, the monomer (a1) consists essentially in 4,4'-isopropylidenediphenol (bisphenol A).

According to another embodiment of the process of the present invention, the monomer (a2) is a 4,4'-dihalosulfone comprising at least one of a 4,4'-dichlorodiphenyl sulfone (DCDPS) or 4,4'-difluorodiphenyl sulfone (DFDPS), preferably 4,4'-dichlorodiphenyl sulfone (DCDPS).

According to another embodiment yet of the process of the present invention, the monomer (a2) comprises, based on the total weight of the monomer (a2), at least 50 wt. % of 4,4'-dichlorodiphenyl sulfone (DCDPS), for example at least 60 wt. %, at least 70 wt. %, at least 80 wt. %, at least 90 wt. % or at least 95 wt. % of DCDPS.

According to the condensation of the present invention, the components of the reaction mixture are generally reacted concurrently. While the temperature of the reaction mixture ($R_G$) is adjusted along the process, the reaction is conducted without isolation of the intermediate products.

The molar ratio of monomer components (a1):(a2) may be from 0.9 to 1.2, for example from 0.92 to 1.15 or from 0.95 to 1.1.

The molar ratio of monomer components (a1):(a2) is preferably from 1.005 to 1.2, or from 1.009 to 1.15. The use of an excess of monomer component (a1) is preferred as it makes a contribution to the reduction in content of polymer-bonded chlorine, in particular at high conversions. In one particularly preferred embodiment, the molar ratio of monomer components (a1):(a2) is from 1.01 to 1.08, in particular from 1.01 to 1.05, very particularly preferably from 1.015 to 1.04. This enables particularly effective control of molecular weight.

The molar ratio of carbonate component:dihydroxy monomer (a1) may be from 1.0 to 1.2, for example from 1.01 to 1.15 or from 1.02 to 1.1. The molar ratio of carbonate component:dihydroxy monomer (a1) is preferably of 1.05 or higher, for example 1.06 or 1.08.

The process of the present invention comprises a step of heating the reaction mixture ($R_G$) to a temperature $T_H$, and optionally maintaining it to this temperature for at least 20 minutes, before increasing the temperature of the reaction mixture ($R_G$) to a reaction temperature $T_R$, wherein the temperature $T_H$ is lower than the reaction temperature $T_R$. More precisely, the temperatures $T_R$ and $T_H$ are such that the following inequality is met: $140°\ C.<T_H<T_R<215°\ C.$ According to an embodiment, the step of increasing the temperature from $T_H$ to $T_R$ is performed over a period of time varying from 5 minutes to 5 hours, for example incrementally or continuously. Here, the term "incrementally" (or "sequentially") means in sequence, for example in a series of sequential temperature increases (for example 2° C./min or 5° C. every 5 minutes) with an interruption between each temperature increase; the term "continuously" means progressively towards reaching the reaction temperature $T_R$ (for example, by 1° C. every minutes until the reaction mixture reaches $T_R$).

According to an embodiment, the step of increasing the temperature from $T_H$ to $T_R$ is performed over a period of time of 1 hour±10 minutes, from a temperature $T_H$ of 140° C.±5° C. to a temperature $T_R$ of 195°±5° C.

In some embodiments, the reaction mixture ($R_G$) is maintained at a temperature $T_H$ for at least 30 minutes, for example for at least 40 minutes, at least 50 minutes or for 1 hour or more. The reaction mixture ($R_G$) may be maintained at a temperature $T_H$ for less than 4 hours, preferably less than 3 hours.

The temperature $T_H$ is lower than the reaction temperature $T_R$. Preferably, the temperature $T_H$ is lower than the reaction temperature $T_R$ by at least 5° C., so that the following inequality is met $T_H<T_R-5°\ C.$ More preferably, the temperature $T_H$ is lower than the reaction temperature by at least 10° C., so that the following inequality is met $T_H<T_R-10°\ C.$ Even more preferably, the temperature $T_H$ is lower than the reaction temperature by at least 15° C., so that the following inequality is met $T_H<T_R-15°\ C.$ According to the present invention, the reaction temperature $T_R$ is less than 215° C. Preferably, the temperature $T_R$ is less than 210° C. More preferably, the temperature $T_R$ is less than 208° C. Even more preferably, the temperature $T_R$ is less than 205° C.

The temperature $T_H$ is more than 140° C. Preferably, the temperature $T_H$ is more than 145° C. More preferably, the temperature $T_H$ is more than 150° C. Even more preferably, the temperature $T_H$ is more than 155° C.

In some embodiments, the temperature $T_H$ is comprised between 140 and 190° C., for example between 145 and 185° C., between 150 and 180° C. or between 155 and 175° C.

According to one preferred embodiment, the reaction mixture ($R_G$) is maintained at a temperature $T_H$ which is 170° C.±5° C. for a period of time which is 1 hour±10 min.

In some embodiments, the temperature $T_R$ is comprised between 180 and 215° C., for example between 185 and 210° C., between 188 and 208° C. between 190 and 205° C.

According to one preferred embodiment, the reaction mixture ($R_G$) is maintained at a temperature $T_H$ which is 170° C.±5° C. for 1 hour±10 min before increasing the temperature of the reaction mixture ($R_G$) to a reaction temperature $T_R$ which is 195° C.±5° C. for at least 1 hour.

In a preferred embodiment, at least one of the inequality (1) or (2) is met:
140° C.<$T_H$<190° C. (1), and/or
180° C.<$T_R$<215° C. (2),
with the proviso that when both inequalities (1) and (2) are met, then $T_H$<$T_R$.

In another preferred embodiment, at least one of the inequality (3) or (4) is met:
150° C.<$T_H$<190° C. (3), and/or
180° C.<$T_R$<210° C. (4),
with the proviso that when both inequalities (3) and (4) are met, then $T_H$<$T_R$.

In some embodiments, the reaction time ranges between 1 and 10 hours, preferably less than 9 hours, even more preferably less than 8 hours.

According to the present invention, the carbonate component can be added to the reaction mixture at once, for example at the beginning to the reaction, or it can be added over a period of time during the polycondensation reaction. This period of time may range from 5 minutes to 5 hours, preferably from 10 minutes to 2 hours, more preferably less than 1 hour. According to one embodiment, the carbonate component is added to the reaction mixture ($R_G$) over a period of time equals to 30 min±5 min.

According to the invention, when the carbonate component is added to the reaction mixture ($R_G$) over a period of time, it can be added sequentially or be continuously added to the reaction mixture ($R_G$). In the context of the present process, the term "sequentially" means in sequence, for example in a series of sequential additions (at least two additions) to the reaction vessel with an interruption between the additions; the term "continuously" means progressively towards conversion of the reactants involved in the reaction mixture. The continuous feeding of one of the component in the reaction vessel can for example be dropwise.

In some embodiments, an alkyl chloride, preferably methyl chloride, is added to the reaction mixture ($R_G$) after the desired molecular weight is attained.

In some embodiments, the reaction conditions are selected such that the conversion (C) is at least 90%, in particular at least 95%, particularly preferably at least 98%. In the context of the present invention, the conversion (C) is the molar proportion of reactive groups (i.e. hydroxy and chloro groups) that have reacted.

According to an embodiment, the process of the present invention is carried out in the absence of a solvent which forms an azeotrope with water is used. According to a preferred embodiment, the process of the present invention is carried out in a solvent which at least partially comprises DMI as a polar aprotic solvent, and in the absence of a solvent which forms an azeotrope with water is used. Solvents which form an azeotrope with water notably include aromatic hydrocarbons such as benzene, toluene, xylene, ethylbenzene, chlorobenzene and the like. All these azeotrope agents are classified as hazardous air pollutants in the USA. In some preferred embodiments, the reaction mixture ($R_G$) does not comprise any substance which forms an azeotrope with water. While in the methods of the prior art, it is described necessary to use an azeotropic agent during the polycondensation, in order to remove from the reactor the water formed from the reaction of component (a1) and component (a2), it has been surprisingly discovered that in the process of the present invention the use of such solvents which form an azeotrope with water is not needed. This makes the process of the invention easier and cost-effective and leads to a polymer with an overall low solvent content, which is most valuable in many applications, especially for membrane preparation. Also, the commercial operations to make polymer without using an azeotrope solvent is much more simplified, efficient, and cost-effective as no secondary operations are needed to recover and reuse the azeotrope solvent. According to this embodiment, the amount of solvent which forms an azeotrope with water is preferably less than 1 wt. %, more preferably less than 0.5 wt. %, even more preferably less than 0.1 wt. %, based on the total weight of solvent in the reaction mixture.

The inorganic constituents, for example sodium chloride or potassium chloride or excess of base, can be removed, before or after isolation of the PSU, by suitable methods such as dissolving and filtering, screening or extracting.

According to the invention, the amount of PSU at the end of the condensation is at least 30 wt. % based on the total weight of the PSU and the solvent, for example at least 35 wt. %, at least 37 wt. %, at least 40 wt. %, at least 45 wt. % or at least 50 wt. %.

At the end of the reaction, the PSU polymer can be separated from the other components (salts, base, . . . ) to obtain a PSU solution. Filtration can for example be used to separate the PSU polymer from the other insoluble components.

The PSU polymers obtained from such process advantageously present a low level of cyclic dimers or cyclic oligomers. Cyclic dimers and oligomers can be represented according to formula (C):

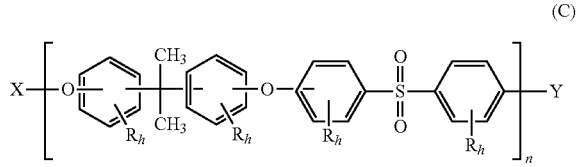

where
n is an integer from 2 to 10, and
Y and X form a bond.

According to an embodiment of the present invention, the PSU comprises less than 1.15 wt. % of cyclic oligomers and cyclic dimers, for example according to formula (C). For example, the PSU comprises less than 1.13 wt. %, less than 1.10 wt. %, less than 1.05 wt. % or even less than 1.0 wt. % of cyclic oligomers and cyclic dimers, based on the total weight of PSU polymers.

The content of oligomers in the reaction mixture can be assessed because the oligomers elute as the two major resolved components after the elution of the PSU and prior to the elution of polymerization reaction solvent, if any is present, when analyzed by Size Exclusion Chromatography (SEC). SEC chromatography can be performed using a P1 gel 5 μm mixed-D, 300×7.5 mm column available from Polymer laboratories with methylene chloride as the elutant.

According to an embodiment, the process of the present invention not only allow to obtain a PSU of a certain Mw and PDI, but also the so-obtained PSU comprises less than 1 wt. % of oligomers having a molecular weight of less than 4,000 g/mol, based on the total weight of PSU polymers, for example less than 0.9 wt. %, less than 0.8 wt. %, less than 0.7 wt. % or even less than 0.5 wt. % of oligomers having a molecular weight of less than 4,000 g/mol, less than 3,000 g/mol or less than 2,000 g/mol.

According to another embodiment, the process of the present invention allows to obtain a PSU also having:
- a VR40 melt stability of less than 1.0, for example less than 0.99 or less than 0.98, as measured by the ratio of the viscosity at 40 minutes over the viscosity at 10 minutes, on the 25 mm disc using a TA Instruments ARES G2 Rheometer (at 380° C. with a gap of 1.6 mm, oscillatory time sweep analysis used a frequency of 10.0 rad/s with a strain of 5.0%),
- a flexural strength of at least 110.0 MPa, at least 110.2, at least 110.5 or at least 110.8, as measured according to ASTM method D790 (2 mm/minute room temperature on six specimens, with a span or gauge of 50.8 mm and loading radius of 5 mm), and/or
- a modulus of elasticity of at least 2.50 GPa, for example at least 2.55 GPa, at least 2.60 GPa or at least 2.65 GPa, as measured according to ASTM 638.

PSU Polymer, Compositions and Articles

The present invention also relates to the PSU having a weight average molecular weight (Mw) of from 70,000 g/mol to 200,000 g/mol, and a polydispersity index (PDI) of less than 4.

According to an embodiment, this PSU is obtained from the preparation process described above, particularly in a solvent which comprises 1,3-dimethyl-2-imidazolidinone (DMI).

In some embodiments, the PSU may have less than 300 ppm (wt) content of DMI, based on the total weight of the PSU, for example less than 200 ppm (wt) of DMI, less than 100 ppm (wt), less than 50 ppm (wt) of DMI or less than 10 ppm (wt) of DMI.

In some other embodiments, the PSU may have from 1 ppm (wt) to less than 300 ppm (wt) content of DMI, based on the total weight of the PSU, for example from 1 to 200 ppm (wt) of DMI, from 1 to 100 ppm (wt), from 1 to 50 ppm (wt) of DMI or from 1 to 10 ppm (wt) of DMI.

In some embodiments, the PSU of the present invention has a yellowness index (YI) of less than 6.0, as measured according to ASTM E313 using an x-rite Color i7 spectrophotometer, for example a YI of less than or equal to 5.9.

In some embodiments, the PSU of the present invention preferably has less than 400 ppm (wt) content of polymer-bonded chlorine, based on the total weight of the PSU, for example less than 300 ppm (wt), less than 200 ppm (wt), less than 100 ppm (wt), less than 50 ppm (wt) or even less than 20 ppm (wt).

In some other embodiments, the PSU of the present invention has at least 1 ppm (wt) content of polymer-bonded chlorine, based on the total weight of the PSU, for example from 1 to 300 ppm (wt) of polymer-bonded chlorine, from 1 to 200 ppm (wt) of polymer-bonded chlorine, from 1 to 100 ppm (wt) of polymer-bonded chlorine, from 1 to 50 ppm (wt) of polymer-bonded chlorine or from 1 to 10 ppm (wt) of polymer-bonded chlorine.

Such advantageous features can be obtained by the process described above, the use of DMI, the preferred absence of a solvent which forms an azeotrope with water, the minimum concentration of the reactive entities in the reaction mixture during the condensation (as assessed by the minimum concentration in the reaction mixture (RG) at the end of the reaction).

According to another embodiment, the PSU of the present invention presents at least one of the following features:
- a VR40 melt stability of less than 1.0, for example less than 0.99 or less than 0.98, as measured by the ratio of the viscosity at 40 minutes over the viscosity at 10 minutes, on the 25 mm disc using a TA Instruments ARES G2 Rheometer (at 380° C. with a gap of 1.6 mm, oscillary time sweep analysis used a frequency of 10.0 rad/s with a strain of 5.0%),
- a flexural strength of at least 110.0 MPa, at least 110.2, at least 110.5 or at least 110.8, as measured according to ASTM method D790 (2 mm/minute room temperature on six specimens, with a span or gauge of 50.8 mm and loading radius of 5 mm), and/or
- a modulus of elasticity of at least 2.50 GPa, for example at least 2.55 GPa, at least 2.60 GPa or at least 2.65 GPa, as measured according to ASTM 638.

The present invention also relates to a thermoplastic composition (C) comprising the PSU of the present invention, as described above, as well as to articles comprising the polymer composition (C) which comprises at least the PSU of the invention. Such a composition can be used for the production of moldings, fibers, films, membranes, or foams. The present invention also relates to a molding, fiber, film, membrane, or foam comprising the thermoplastic composition (C) or the PSU polymer of the present invention.

The thermoplastic composition (C) may comprise PSU in an amount of at least 1 wt. %, for example at least 5 wt. %, at least 10 wt. %, at least 15 wt. %, at least 20 wt. %, at least 25 wt. %, or at least 30 wt. %, based on the total weight of the thermoplastic composition (C).

The thermoplastic composition (C) may comprise PSU in an amount of more than 50 wt. %, for example more than 55 wt. %, more than 60 wt. %, more than 65 wt. %, more than 70 wt. %, more than 75 wt. %, more than 80 wt. %, more than 85 wt. %, more than 90 wt. %, more than 95 wt. % or more than 99 wt. %, based on the total weight of the thermoplastic composition (C).

According to an embodiment, the thermoplastic composition (C) comprises PSU in an amount ranging from 1 to 99 wt. %, for example from 3 to 96 wt. %, from 6 to 92 wt. % or from 12 to 88 wt. %, based on the total weight of the thermoplastic composition (C).

The thermoplastic composition (C) may further optionally comprise one or more additional additives selected from the group consisting of ultraviolet light stabilizers, heat stabilizers, acid scavengers (i.e. zinc oxide, magnesium oxide), antioxidants, pigments, processing aids, lubricants, flame retardants, and/or conductivity additive (i.e. carbon black and carbon nanofibrils).

The thermoplastic composition (C) may also further comprise other polymers than PSU, for example another sulfone polymer, e.g. poly(biphenyl ether sulfone) (PPSU), polyethersulfone (PES), or a polyphenylene sulfide (PPS), a poly(aryl ether ketone) (PAEK), e.g. a poly(ether ether ketone) (PEEK), a poly(ether ketone ketone) (PEKK), a poly(ether ketone) (PEK) or a copolymer of PEEK and poly(diphenyl ether ketone) (PEEK-PEDEK copolymer), polyetherimide (PEI), and/or polycarbonate (PC).

The thermoplastic composition (C) may further comprise flame retardants such as halogen and halogen free flame retardants.

The thermoplastic composition (C) may comprise glass fibers, for example E-glass fibers or high modulus glass fibers having an elastic modulus (also called tensile modulus of elasticity) of at least 76, preferably at least 78, more preferably at least 80, and most preferably at least 82 GPa as measured according to ASTM D2343. The polymer composition (C) may also comprise high modulus glass fibers selected from the group consisting of R, S and T glass fibers, for example in an amount of at least 5 wt. %, for example at least 10 wt. %, at least 15 wt. %, at least 20 wt. %, at least 25 wt. %, at least 26 wt. %, or at least 28 wt. %, based on the total weight of the thermoplastic composition (C). The thermoplastic composition (C) may comprise circular cross-section glass fibers and/or non-circular cross-section glass fibers (e.g. flat, rectangular, cocoon-shaped glass fibers).

The thermoplastic composition (C) can be made by methods well known to the person skilled in the art. For example, such methods include, but are not limited to, melt-mixing processes. Melt-mixing processes are typically carried out by heating the polymer components above the melting temperature of the thermoplastic polymers thereby forming a melt of the thermoplastic polymers. In some embodiments, the processing temperature ranges from about 280-450° C., preferably from about 290-400° C., from about 300-360° C. or from about 310-340° C. Suitable melt-mixing apparatus are, for example, kneaders, Bradbury mixers, single-screw extruders, and twin-screw extruders. Preferably, use is made of an extruder fitted with means for dosing all the desired components to the extruder, either to the extruder's throat or to the melt. The components of the polymer composition are fed to the melt-mixing apparatus and melt-mixed in that apparatus. The components may be fed simultaneously as a powder mixture or granule mixer, also known as dry-blend, or may be fed separately.

The order of combining the components during melt-mixing is not particularly limited. In one embodiment, the component can be mixed in a single batch, such that the desired amounts of each component are added together and subsequently mixed. In other embodiments, a first sub-set of components can be initially mixed together and one or more of the remaining components can be added to the mixture for further mixing. For clarity, the total desired amount of each component does not have to be mixed as a single quantity. For example, for one or more of the components, a partial quantity can be initially added and mixed and, subsequently, some or all of the remainder can be added and mixed.

The thermoplastic composition (C) may be well suited for the manufacture of articles useful in a wide variety of applications. For example, The PSU polymers of the present invention are well-suited for the fabrication of porous hollow fiber ad flat sheet membranes using a solvent-based process. They can be used in a variety of membrane filtration applications, such as renal dialysis, water treatment, bioprocessing, food and beverage processing and industrial gas separation. The low color PSU prepared according to the present invention has a superior appearance and can be well suited for use in applications where color, particularly a yellow color, is unacceptable such as, for example, in lenses, filters and other optical goods, for transparent covers or lids and in containers, glazing and other articles where transparency with low color is desirable or necessary. Lacking the yellow or beige cast of the prior art resins, the improved resins of this invention may also be more readily dyed or pigmented to achieve a desired coloration. The invented resins thus may also find use in filled and pigmented applications, particularly where white and brightly-colored goods are desired.

In some aspects, the shaped articles may be made from the polymer composition using any suitable melt-processing method such as injection molding, extrusion molding, roto-molding, or blow-molding.

Should the disclosure of any patents, patent applications, and publications which are incorporated herein by reference conflict with the description of the present application to the extent that it may render a term unclear, the present description shall take precedence.

Exemplary embodiments will now be described in the following non-limiting examples.

EXAMPLES

The disclosure will be now described in more detail with reference to the following examples, whose purpose is merely illustrative and not intended to limit the scope of the disclosure.

Starting Materials 4,4'-Isopropylidenediphenol (bisphenol A) polycarbonate grade (>99.5% pure)

4,4'-dichlorodiphenylsulfone (DCPDS)>99.7% pure

Potassium carbonate ($K_2CO_3$), with a $d_{90}$<45 μm, commercially available from Sigma Aldrich N-methyl-2-pyrrolidinone (NMP), commercially available from Sigma Aldrich (≥99.0% pure)

1,3-dimethyl-2-imidazolidinone (DMI), commercially available from TCI America (>99% pure)

Methyl chloride (MeCl), commercially available from Matheson (99.9% pure)

Oxalic acid dehydrate $(COOH)_2 \cdot 2H_2O$, commercially available from Sigma Aldrich Methanol (100% pure), commercially available from Brenntag Toluene, commercially available from Fisher Chemical (≥99.5% pure)

The following polymers were prepared:

PSU #1 (comparative), a polysulfone (PSU) with a Mw of 85,035 g/mol and a PDI of 3.19, was prepared in NMP according to the following process:

To a 1-L resin flask equipped with an overhead agitator, a nitrogen dip-tube, dean-stark trap with reflux condenser was charged 103.1740 g (0.4519 mol) of bisphenol A, 129.7799 g (0.4519 mol) of DCPDS, 65.5861 g (0.4745 mol) of $K_2CO_3$ and 200.00 g of NMP. Agitation and nitrogen flow were established and the reaction mixture was purged with nitrogen for 30 minutes before starting heat via external oil bath with a target internal temperature of 195° C. Water, a byproduct of the polymerization reaction, was continuously stripped out of the reactor and collected in the dean-stark trap. Upon reaching 195° C., the reaction was held at that temperature until the desired Mw was achieved. Once desired molecular weight was achieved the polymerization was terminated by sparging gaseous MeCl through the reaction mixture at a rate of 1 g/min over 30 minutes. The reaction mixture was diluted with 600 g of NMP containing 1.27 g oxalic acid dihydrate. The dilute polymer solution was filtered through a 2.7 μm glass fiber filter pad under pressure to remove salts. The polymer solution was precipitated in methanol at a ratio of 1:30 polymer to non-solvent to afford a white solid. The isolated white solid was then washed with methanol 6 times, vacuum filtered, and dried for 24 h in a vacuum baking oven at 120° C. The molecular weight and its distribution were measured by SEC. Results are shown in Table 1.

PSU #2 (comparative), a polysulfone (PSU) with a Mw of 66,562 g/mol and a PDI of 2.76, was prepared according to the exact same process than example 1, except that the condensation was carried out in DMI instead of NMP:

To a 1-L resin flask equipped with an overhead agitator, a nitrogen dip-tube, dean-stark trap with reflux condenser was charged 159.80 g (0.70 mol) of bisphenol A, 201.01 g (0.70 mol) of DCPDS, 101.58 g (0.735 mol) of $K_2CO_3$ and 309.77 g of DMI. Agitation and nitrogen flow were established and the reaction mixture was purged with nitrogen for 30 minutes before starting heat via external oil bath with a target internal temperature of 190° C. Water, a byproduct of the polymerization reaction, was continuously stripped out of the reactor and collected in the dean-stark trap. Upon reaching 195° C., the reaction was held at that temperature until the desired Mw was achieved. Once desired molecular weight was achieved the polymerization was terminated by sparging gaseous MeCl through the reaction mixture at a rate of 1 g/min over 30 minutes. The reaction mixture was diluted with 1,351 g of DMI. The dilute polymer solution was filtered through a 2.7 μm glass fiber filter pad under pressure to remove salts. The polymer solution was precipitated in methanol at a ratio of 1:30 polymer to non-solvent to afford a white solid. The isolated white solid was then washed with methanol 6 times, vacuum filtered, and dried for 24 h in a vacuum baking oven at 120° C. The molecular weight and its distribution were measured by SEC. Results are shown in Table 1.

PSU #3 (comparative): a polysulfone (PSU) with a Mw of 153,966 g/mol and a PDI of 6.76, was prepared in DMI according to the process generally described in JP3294332A2 (UBE):

To a 1-L resin flask equipped with an overhead agitator, a nitrogen dip-tube, dean-stark trap with reflux condenser was charged 79.90 g (0.35 mol) of bisphenol A, 100.51 g (0.35 mol) of DCPDS, 53.21 g (0.385 mol) of $K_2CO_3$, 441.01 g of DMI and 24.28 g toluene. Agitation and nitrogen flow were established and the reaction mixture was purged with nitrogen for 15 minutes before starting heat via external oil bath with a target internal temperature of 190° C. Water, a byproduct of the polymerization reaction, was continuously stripped out of the reactor and collected in the dean-stark trap. Upon reaching 190° C., the reaction was held at that temperature for 5 hours. The reaction mixture was cooled to 130° C. and methyl chloride gas was sparged through the reaction mixture at a rate of 1 g/min for 30 minutes. The reaction mixture was diluted with 440 g of DMI. The dilute polymer solution was filtered through a 2.7 μm glass fiber filter pad under pressure to remove salts. The polymer solution was precipitated in methanol at a ratio of 1:30 polymer to non-solvent to afford a white solid. The isolated white solid was then washed with methanol 6 times, vacuum filtered, and dried for 24 h in a vacuum baking oven at 120° C. The molecular weight and its distribution were measured by SEC. Results are shown in Table 1.

PSU #4 (comparative): a polysulfone (PSU) with a Mw of 84,013 g/mol and a PDI of 3.12, was prepared in NMP according to example 1, except that the condensation was carried at a different temperature setup:

To a 1-L resin flask equipped with an overhead agitator, a nitrogen dip-tube, dean-stark trap with reflux condenser was charged 103.1740 g (0.4519 mol) of bisphenol A, 129.7799 g (0.4519 mol) of DCDPS, 65.5861 g (0.4745 mol) of $K_2CO_3$ and 200.00 g of NMP. Agitation and nitrogen flow were established and the reaction mixture was purged with nitrogen for 30 minutes before starting heat via external oil bath with a target internal temperature of 170° C. Water, a byproduct of the polymerization reaction, was continuously stripped out of the reactor and collected in the dean-stark trap. Upon reaching 170° C., the reaction was held at that temperature for 1 h and then ramped to 195° C. Upon reaching 195° C., the reaction was held at that temperature until the desired Mw was achieved. Once desired molecular weight was achieved the polymerization was terminated by sparging gaseous MeCl through the reaction mixture at a rate of 1 g/minute over 30 minutes. The reaction mixture was diluted with 600 g of NMP. The dilute polymer solution was filtered through a 2.7 μm glass fiber filter pad under pressure to remove salts. The polymer solution was precipitated in methanol at a ratio of 1:30 polymer to non-solvent to afford a white solid. The isolated white solid was then washed with methanol 6 times, vacuum filtered, and dried for 24 h in a vacuum baking oven at 120° C. The molecular weight and its distribution were measured by SEC. Results are shown in Table 1.

PSU #5 (inventive): a polysulfone (PSU) with a Mw of 71,082 g/mol and a PDI of 3.64, was prepared in DMI as follows:

To a 1-L resin flask equipped with an overhead agitator, a nitrogen dip-tube, dean-stark trap with reflux condenser was charged 103.1740 g (0.4519 mol) of bisphenol A, 129.7799 g (0.4519 mol) of DCDPS, 65.5861 g (0.4745 mol) of $K_2CO_3$ and 270.59 g of DMI. Agitation and nitrogen flow were established and the reaction mixture was purged with nitrogen for 30 minutes before starting heat via external oil bath with a target internal temperature of 195° C. Water, a byproduct of the polymerization reaction, was continuously stripped out of the reactor and collected in the dean-stark trap Upon reaching 195° C., the reaction was held at that temperature until the desired Mw was achieved. Once desired molecular weight was achieved the polymerization was terminated by sparging gaseous MeCl through the reaction mixture at a rate of 1 g/min over 30 minutes. The reaction mixture was diluted with 529.41 g of DMI. The dilute polymer solution was filtered through a 2.7 μm glass fiber filter pad under pressure to remove salts. The polymer solution was precipitated in methanol at a ratio of 1:30 polymer to non-solvent to afford a white solid. The isolated white solid was then washed with methanol 6 times, vacuum filtered, and dried for 24 h in a vacuum baking oven at 120° C. The molecular weight and its distribution were measured by SEC. Yield: >90%. Results are shown in Table 1.

PSU #6 (inventive): a polysulfone (PSU) with a Mw of 86,687 g/mol and a PDI of 3.27, was prepared in DMI as follows:

To a 1-L resin flask equipped with an overhead agitator, a nitrogen dip-tube, dean-stark trap with reflux condenser was charged 103.1740 g (0.4519 mol) of bisphenol A, 129.7799 g (0.4519 mol) of DCDPS and 200.00 g of DMI. Agitation and nitrogen flow were established and the reaction mixture was purged with nitrogen for 30 minutes before starting heat via external oil bath with a target internal temperature of 170° C. Water, a byproduct of the polymerization reaction, was continuously stripped out of the reactor and collected in the dean-stark trap. Upon reaching 150° C., 65.5861 g (0.4745 mol) of $K_2CO_3$ was charged over 30 min in four portions. Upon reaching 170° C., the reaction was held at that temperature for 1 h and then ramped to 195° C. Upon reaching 195° C., the reaction was held at that temperature until the desired Mw was achieved. Once desired molecular weight was achieved the polymerization was terminated by sparging gaseous MeCl through the reaction mixture at a rate of 1 g/min over 30 minutes. The reaction mixture was diluted with 600 g of DMI. The dilute polymer solution was filtered through a 2.7 µm glass fiber filter pad under pressure to remove salts. The polymer solution was precipitated in methanol at a ratio of 1:30 polymer to non-solvent to afford a white solid. The isolated white solid was then washed with methanol 6 times, vacuum filtered, and dried for 24 h in a vacuum baking oven at 120° C. The molecular weight and its distribution were measured by SEC. Yield: >90%. Results are shown in Table 1.

PSU #7 (inventive): a polysulfone (PSU) with a Mw of 84,069 g/mol and a PDI of 3.46, was prepared in DMI as follows:

To a 1-L resin flask equipped with an overhead agitator, a nitrogen dip-tube, dean-stark trap with reflux condenser was charged 159.80 g (0.700 mol) of bisphenol A, 201.01 g (0.700 mol) of DCDPS, 101.58 g (0.735 mol) of $K_2CO_3$ and 309.77 g of DMI. Agitation and nitrogen flow were established and the reaction mixture was purged with nitrogen for 30 minutes before starting heat via external oil bath with a target internal temperature of 170° C. Water, a byproduct of the polymerization reaction, was continuously stripped out of the reactor and collected in the dean-stark trap. Upon reaching 170° C., the reaction was held at that temperature for 1 h and then ramped to 195° C. Upon reaching 195° C., the reaction was held at that temperature $T_R$ until a Mw of at least 75,000 g/mol was achieved. Once desired molecular weight was achieved the polymerization was terminated by sparging gaseous MeCl through the reaction mixture at a rate of 1 g/min over 30 minutes. The reaction mixture was diluted with 404.0 g of DMI. The dilute polymer solution was filtered through a 2.7 µm glass fiber filter pad under pressure to remove salts. The polymer solution was precipitated in methanol at a ratio of 1:30 polymer to non-solvent to afford a white solid. The isolated white solid was then washed with methanol 6 times, vacuum filtered, and dried for 24 h in a vacuum baking oven at 120° C. The molecular weight and its distribution were measured by SEC. Yield: >90%. Results are shown in Table 2.

PSU #8 (inventive): a polysulfone (PSU) with a Mw of 79,028 g/mol and a PDI of 3.42, was prepared in DMI according to the following process:

To a 1-L resin flask equipped with an overhead agitator, a nitrogen dip-tube, dean-stark trap with reflux condenser was charged 159.80 g (0.700 mol) of bisphenol A, 201.01 g (0.700 mol) of DCDPS, 101.58 g (0.735 mol) of $K_2CO_3$ and 309.77 g of DMI. The rest of the process was the same than for PSU #8, except that the reaction temperature $T_R$ was 200° C. Results are shown in Table 2.

PSU #9 (inventive): a polysulfone (PSU) with a Mw of 80,555 g/mol and a PDI of 3.53, was prepared in DMI according to the following process:

To a 1-L resin flask equipped with an overhead agitator, a nitrogen dip-tube, dean-stark trap with reflux condenser was charged 159.80 g (0.700 mol) of bisphenol A, 201.01 g (0.700 mol) of DCDPS, 101.58 g (0.735 mol) of $K_2CO_3$ and 309.77 g of DMI. The rest of the process was the same than for PSU #8, except that the reaction temperature $T_R$ was 205° C. Results are shown in Table 2.

PSU #10 (inventive): a polysulfone (PSU) with a Mw of 73,626 g/mol and a PDI of 3.48, was prepared in DMI according to the following process:

To a 1-L resin flask equipped with an overhead agitator, a nitrogen dip-tube, dean-stark trap with reflux condenser was charged 159.80 g (0.700 mol) of bisphenol A, 201.01 g (0.700 mol) of DCDPS, 101.58 g (0.735 mol) of $K_2CO_3$ and 309.77 g of DMI. The rest of the process was the same than for PSU #8, except that the reaction temperature $T_R$ was 210° C. Results are shown in Table 2.

PSU #11 (inventive): a polysulfone (PSU) with a Mw of 79,328 g/mol and a PDI of 3.55, was prepared in DMI according to the following process:

To a 1-L resin flask equipped with an overhead agitator, a nitrogen dip-tube, dean-stark trap with reflux condenser was charged 159.80 g (0.700 mol) of bisphenol A, 201.01 g (0.700 mol) of DCDPS, 101.58 g (0.735 mol) of $K_2CO_3$ and 309.77 g of DMI. The rest of the process was the same than for PSU #8, except that the reaction temperature $T_R$ was 190° C. Results are shown in Table 2.

PSU #12 (inventive): a polysulfone (PSU) with a Mw of 85,368 g/mol and a PDI of 3.56, was prepared in DMI according to the following process:

To a 1-L resin flask equipped with an overhead agitator, a nitrogen dip-tube, dean-stark trap with reflux condenser was charged 159.80 g (0.700 mol) of bisphenol A, 201.01 g (0.700 mol) of DCDPS, 101.58 g (0.735 mol) of $K_2CO_3$ and 309.77 g of DMI. The rest of the process was the same than for PSU #8, except that the temperature $T_H$ was hold 3 hours at 170° C. Results are shown in Table 2.

PSU #13 (inventive): a polysulfone (PSU) with a Mw of 85,368 g/mol and a PDI of 3.56, was prepared in DMI according to the following process:

To a 1-L resin flask equipped with an overhead agitator, a nitrogen dip-tube, dean-stark trap with reflux condenser was charged 159.80 g (0.700 mol) of bisphenol A, 201.01 g (0.700 mol) of DCDPS, 103.52 g (0.749 mol) of $K_2CO_3$ and 309.77 g of DMI. The rest of the process was the same than for PSU #8, except that the reaction temperature $T_H$ was 150° C. Results are shown in Table 3.

PSU #14 (inventive): a polysulfone (PSU) with a Mw of 88,377 g/mol and a PDI of 3.60, was prepared in DMI according to the following process:

To a 1-L resin flask equipped with an overhead agitator, a nitrogen dip-tube, dean-stark trap with reflux condenser was charged 159.80 g (0.700 mol) of bisphenol A, 201.01 g (0.700 mol) of DCDPS, 103.52 g (0.749 mol) of $K_2CO_3$ and 309.77 g of DMI. The rest of the process was the same than for PSU #8, except that the reaction temperature $T_H$ was 180° C. Results are shown in Table 3.

PSU #15 (inventive): a polysulfone (PSU) with a Mw of 86,243 g/mol and a PDI of 3.55, was prepared in DMI according to the following process:

To a 1-L resin flask equipped with an overhead agitator, a nitrogen dip-tube, dean-stark trap with reflux condenser was charged 159.80 g (0.700 mol) of bisphenol A, 201.01 g (0.700 mol) of DCDPS, 103.52 g (0.749 mol) of $K_2CO_3$ and 309.77 g of DMI. The rest of the process was the same than for PSU #8, except that the reaction temperature $T_H$ was 160° C. Results are shown in Table 3.

PSU #16 (comparative): a polysulfone (PSU) with a Mw of 59,849 g/mol and a PDI of 3.12, was prepared in DMI as follows:

To a 1-L resin flask equipped with an overhead agitator, a nitrogen dip-tube, dean-stark trap with reflux condenser was charged 159.80 g (0.700 mol) of bisphenol A, 201.01 g (0.700 mol) of DCDPS, 101.58 g (0.735 mol) of $K_2CO_3$ and 309.77 g of DMI and 102.60 g of MCB. Agitation and nitrogen flow were established and the reaction mixture was purged with nitrogen for 30 minutes before starting heat via external oil bath with a target internal temperature of 195° C. Water, a byproduct of the polymerization reaction, was continuously stripped out of the reactor and collected in the dean-stark trap. Upon reaching 195° C., the reaction was held at that temperature until the desired Mw was achieved. Once desired molecular weight was achieved the polymerization was terminated by sparging gaseous MeCl through the reaction mixture at a rate of 1 g/min over 30 minutes. The reaction mixture was diluted with 343 g of DMI. The dilute polymer solution was filtered through a 2.7 µm glass fiber filter pad under pressure to remove salts. The polymer solution was precipitated in methanol at a ratio of 1:30 polymer to non-solvent to afford a white solid. The isolated white solid was then washed with methanol 6 times, vacuum filtered, and dried for 24 h in a vacuum baking oven at 120° C. The molecular weight and its distribution were measured by SEC. Yield: >90%. Results are shown in Table 3.

PSU #17 (comparative): a polysulfone (PSU) with a Mw of 62,876 g/mol and a PDI of 3.19, was prepared in DMI as follows:

To a 1-L resin flask equipped with an overhead agitator, a nitrogen dip-tube, dean-stark trap with reflux condenser was charged 159.80 g (0.700 mol) of bisphenol A, 201.01 g (0.700 mol) of DCDPS, 106.42 g (0.770 mol) of $K_2CO_3$ and 309.77 g of DMI. The rest of the process was the same than for PSU #16, except that the reaction temperature $T_R$ was 200° C. Results are shown in Table 3.

PSU #18 (comparative): a polysulfone (PSU) with a Mw of 6,997 g/mol and a PDI of 6.01, was prepared in DMI as follows:

To a 1-L resin flask equipped with an overhead agitator, a nitrogen dip-tube, dean-stark trap with reflux condenser was charged 159.80 g (0.700 mol) of bisphenol A, 201.01 g (0.700 mol) of DCDPS, 101.58 g (0.735 mol) of $K_2CO_3$ and 309.77 g of DMI. The rest of the process was the same than for PSU #16, except that the reaction temperature $T_R$ was 175° C. Results are shown in Table 3.

PSU #19 (comparative): An attempt to prepare a polysulfone (PSU) according to the process generally described in JP H05 86186 (Mitsui) using a strong base chemistry (aq KOH) with an azeotrope (toluene): To a 1-L resin flask equipped with an overhead agitator, a nitrogen dip-tube, dean-stark trap with reflux condenser was charged 57.07 g (0.250 mol) of bisphenol A, 300.75 g of DMI, 125 ml of toluene, and 70.132 g (0.500 mol) of aqueous 40% potassium hydroxide solution. The nitrogen gas flow was established through the dip tube. The mixture was heated to 130° C. under a constant flow of nitrogen. Azeotropic dehydration was carried out at 130° C. for 4 hours while returning toluene back to the reactor. After 4 hours of dehydration, a solution of 71.790 g (0.250 mol) of DCDPS solution in 50 g of toluene was added to the reactor using an addition funnel. The reactor contents were heated to 150° C. while removing toluene. The polymerization was conducted at 150° C. for 4 hours. At the end of the polymerization time, a pale yellow slightly viscous solution was obtained. The reactor contents were cooled down to room temperature, and discharged into a rapidly stirred 1250 g methanol using a Waring blender. The polymer powder was filtered and placed in a beaker with 1250 g water and stirred. 1N HCl was added slowly to adjust the pH between 3 and 4. The polymer powder was isolated by filtration. The polymer powder was washed in a Waring blender two times using 1250 g DI water each time. A final wash with 1250 g methanol was carried out before drying the polymer in a vacuum oven at 150° C. for 12 hours. The results are shown in Table 3.

Characterization of the Polymers

Determination of Molecular Weight and Cyclic Dimer Content

Size Exclusion Chromatography (SEC) was performed using Methylene Chloride as a mobile phase. Two 5 µm mixed D Size Exclusion Chromatography (SEC) columns with guard column from Agilent Technologies was used for separation. An ultraviolet detector of 254 nm is used to obtain the chromatogram. A flow rate of 1.5 ml/min and injection volume of 20 µL of a 0.2% w/v solution in mobile phase was selected.

Calibration was performed using 10 narrow calibration standards of Polystyrene obtained from Agilent Technologies (Peak molecular weight range: 371000 to 580)

Calibration Curve:
1) Type: Relative, Narrow calibration standard calibration
2) Fit: 3rd order regression.

Integration and calculation: Empower Pro GPC software manufactured by Waters used to acquire data, calibration and molecular weight calculation. Peak integration start and end points are manually determined from significant difference on global baseline.

Determination of Melt Stability and Mechanical Properties by Compression Molding Polymer strands were produced from isolated powders of various polymer compositions on a DSM Xplore® Micro Compounder using the following conditions:

Barrel temperature (top, middle, bottom): 360° C.
75-100 rpm screw speed
3-5 minute residence time The polymer strands were cut into 12.7 mm or less pellets.
A 102 mm×102 mm×3.2 mm plaque was prepared from the pelletized polymer by compression molding of 45 g of polymer under the following conditions:

Preheat at 338° C.
338° C./15 minutes, 2041 kg-f
338° C./x minutes, 2268 kg-f
cool down to 30° C. over 40 minutes, 2041 kg-f The 102 mm×102 mm×3.2 mm compression molded plaques were machined into six 12.7 mm×63.5 mm flexural test specimens and a 25 mm disc for parallel plates testing.

The flex specimens of the various polymer compositions were subjected to flexural testing according to ASTM method D790 at 2 mm/minute room temperature (i.e. 23° C.) on six specimens. The method utilized a span or gauge of 50.8 mm and loading radius of 5 mm. The average of the six specimens is presented.

The melt stability was measured on the 25 mm disc using a TA Instruments ARES G2 Rheometer. Readings were taken after 10-minute and 40-minute dwell time at 380° C. with a gap of 1.6 mm. The oscillary time sweep analysis used a frequency of 10.0 rad/s with a strain of 5.0%. The melt stability, VR40, is measured by the ratio of the viscosity at 40 minutes over the viscosity at 10 minutes.

Determination of Yellowness Index by Compression Molding

A 50.8 mm×50.8 mm×1.6 mm plaque was prepared from 6 g of the isolated powder of various polymer compositions under the following conditions:

Preheat at 338° C.
338° C./20 minutes, 454 kg-f
338° C./2 minutes, 499 kg-f
cool down to 30° C. over 40 minutes, 454 kg-f The compression molded plaque of various polymer compositions were subjected to yellowness index analysis according to ASTM E313 using an x-rite Color i7 spectrophotometer. The average of four readings is presented.

TABLE 1

|  | PSU#1 (comp) | PSU#2 (comp) | PSU#3 (comp) | PSU#4 (comp) | PSU#5 (inv) | PSU#6 (inv) |
|---|---|---|---|---|---|---|
| Solvent | NMP | DMI | DMI | NMP | DMI | DMI |
| Concentration (%) | 50 | 50 | 26 | 50 | 42.5 | 50 |
| $T_H$ (° C.)—$t_H$ | none | none | none | 170° C. 1 hour | 170° C. 1 hour | 170° C. 1 hour |
| $T_R$ (° C.) | 195 | 195 | 195 | 195 | 195 | 195 |
| Mw (g/mol) | 85,035 | 66,562 | 153,966 | 84,013 | 72,082 | 86,687 |
| PDI | 3.19 | 2.76 | 6.67 | 3.12 | 3.64 | 3.27 |
| Cyclic dimers/Oligomers (%) | 0.73 | 0.50 | 1.38 | 0.67 | 1.26 | 0.72 |
| Residual solvent (ppm) | 16 | <10 | 94 | 82 | <10 | 62 |
| YI | 8.3 | 6.0 | 20.3 | 7.5 | — | 5.9 |
| VR40 | 1.10 | 1.0 | 0.90 | 1.03 | — | 0.97 |
| Modulus elasticity (GPa) | 2.55 | 2.70 | 2.76 | 2.68 | — | 2.73 |
| Flexural strength (MPa) | 105.5 | 109.6 | 106.9 | 109.6 | — | 111.0 |

TABLE 2

|  | PSU#7 (inv) | PSU#8 (inv) | PSU#9 (inv) | PSU#10 (inv) | PSU#11 (inv) | PSU#12 (inv) |
|---|---|---|---|---|---|---|
| Solvent | DMI | DMI | DMI | DMI | DMI | DMI |
| $T_H$ (° C.)—$t_H$ | 170° C. 1 hour | 170° C. 1 hour | 170° C. 1 hour | 170° C. 1 hour | 170° C. 1 hour | 170° C. 3 hours |
| $T_R$ (° C.) | 195 | 200 | 205 | 210 | 190 | 195 |
| Mw (g/mol) | 84,069 | 79,028 | 80,555 | 73,626 | 79,238 | 78,162 |
| PDI | 3.46 | 3.42 | 3.53 | 3.48 | 3.55 | 3.36 |
| Reaction time (h) | 6.2 | 4.5 | 5.9 | 6.0 | 10.0 | 5.78 |
| Cyclic dimers/Oligomers (%) | 0.98 | 1.03 | 1.11 | 1.29 | 0.99 | 1.03 |

TABLE 3

|  | PSU#13 (inv) | PSU#14 (inv) | PSU#15 (inv) | PSU#16 (comp) | PSU#17 (comp) | PSU#18 (inv) | PSU#19 (comp) |
|---|---|---|---|---|---|---|---|
| Solvent | DMI | DMI | DMI | DMI w/azeotrope | DMI | DMI | DMI w/azeotrope |
| $T_H$ (° C.)—$t_H$ | 150° C. 1 hour | 180° C. 1 hour | 160° C. 1 hour | none | none | none | none |
| $T_R$ (° C.) | 195 | 195 | 195 | 190 | 200 | 175 | 160 |
| Mw (g/mol) | 85,368 | 88,377 | 86,243 | 59,849 | 62,876 | 6,997 | 20,864 |
| PDI | 3.56 | 3.60 | 3.55 | 3.12 | 3.19 | 1.84 | 2.36 |
| Reaction time (h) | 4.53 | 4.52 | 4.55 | 3.58 | 7.45 | 7.03 | 4 |
| Cyclic dimers/Oligomers (%) | 1.11 | 1.05 | 1.03 | 1.16 | 1.18 | 6.01 | 2.13 |

The invention claimed is:

1. A process for preparing a polysulfone (PSU) polymer by condensation in a reaction mixture ($R_G$) comprising:
    at least one aromatic dihydroxy monomer (a1) comprising 4,4'-isopropylidenediphenol;
    at least one aromatic dihalogen sulfone monomer (a2) comprising at least one dihalogen compound selected from the group consisting of 4,4'-dichlorodiphenyl sulfone (DCPDS) and 4,4'-difluorodiphenyl sulfone (DFDPS), based on the overall weight of component (a2) in reaction mixture ($R_G$);
    at least one carbonate component;
    in a solvent which comprises 1,3-dimethyl-2-imidazolidinone (DMI);
    wherein the PSU polymer has a weight average molecular weight (Mw) of from 70,000 g/mol to 200,000 g/mol, as measured by Size Exclusion Chromatography (SEC) using Methylene Chloride as a mobile phase, and a polydispersity index (PDI) of less than 4 (PDI is Mw/Mn),
    wherein the process comprises a step of heating the reaction mixture ($R_G$) to a temperature $T_H$, and maintaining the reaction mixture ($R_G$) to this temperature $T_H$ for at least 20 minutes, before increasing the temperature of the reaction mixture ($R_G$) to a reaction temperature $T_R$, wherein the temperatures $T_H$ and $T_R$ are such that 140° C.<$T_H$<$T_R$<215° C., and
    wherein the amount of PSU at the end of the condensation is at least 30 wt. % based on the total weight of the PSU and the solvent.

2. The process of claim 1, wherein the monomer (a1) comprises, based on the total weight of the monomer (a1), at least 50 wt. % of 4,4'-isopropylidenediphenol.

3. The process of claim 1, wherein the monomer (a2) comprises, based on the total weight of the monomer (a2), at least 50 wt. % of 4,4'-dichlorodiphenyl sulfone (DCPDS).

4. The process of claim 1, wherein the step of increasing the temperature from $T_H$ to $T_R$ is performed over a period of time varying from 5 minutes to 5 hours.

5. The process of claim 1, wherein at least one of the inequality (1) or (2) is met:

$$140° C.<T_H<190° C. \quad (1)$$

$$180<T_R<215° C. \quad (2)$$

with the proviso that when both inequalities (1) and (2) are met, then $T_H$<$T_R$.

6. The process of claim 1, wherein the following inequality is met: $T_H$≤$T_R$-5° C.

7. The process of claim 1, where the reaction mixture ($R_G$) does not comprise any substance which forms an azeotrope with water.

8. The process of claim 1, wherein the molar ratio of the monomer component (a1) to the monomer component (a2) is from 1.01 to 1.05.

9. A polysulfone (PSU) polymer obtainable by the process of claim 1, having a weight average molecular weight (Mw) of from 70,000 g/mol to 200,000 g/mol, as measured by GPC with light scattering according to the ASTM D-4001-

93, a polydispersity index (PDI) of less than 4 (PDI is Mw/Mn), and a yellowness index (YI) of less than 6.0, as measured according to ASTM E313 using an x-rite Color i7 spectrophotometer.

10. The PSU polymer of claim 9, having from 1 ppm (wt) to less than 300 ppm (wt) content of DMI, based on the total weight of the PSU polymer.

11. The PSU polymer of claim 9, comprising less than 400 ppm (wt) content of polymer-bonded chlorine, based on the total weight of the PSU polymer.

12. The PSU polymer of claim 9, comprising less than 1.15 wt. % of cyclic oligomers and cyclic dimers, based on the total weight of PSU polymer.

13. A thermoplastic composition, comprising the PSU polymer of claim 9.

14. A molding, fiber, film, membrane, or foam comprising the PSU polymer of claim 9.

* * * * *